(12) United States Patent
Emiglio

(10) Patent No.: US 6,462,311 B1
(45) Date of Patent: Oct. 8, 2002

(54) MODULAR CONVECTION OVEN

(76) Inventor: Michael R. Emiglio, 525 Beach Blvd., Hamilton, Ontario (CA), L8H 6X4

(*) Notice: Subject to any disclaimer, the term of this patent is extended or adjusted under 35 U.S.C. 154(b) by 0 days.

(21) Appl. No.: 09/986,486

(22) Filed: Nov. 9, 2001

(51) Int. Cl.[7] .............................. A21B 1/26; A21B 3/00; F27D 1/00; F27D 7/04

(52) U.S. Cl. ...................... 219/400; 219/391; 220/4.31

(58) Field of Search ................................. 219/391, 400, 219/385, 386, 403; 126/19 R–19 M, 190, 4–7, 912; 220/4.28, 4.31, 4.33

(56) References Cited

U.S. PATENT DOCUMENTS

| | | | | |
|---|---|---|---|---|
| 5,560,508 A | * | 10/1996 | Hsu | 220/4.31 |
| 5,765,707 A | * | 6/1998 | Kenevan | 220/4.28 |
| 6,089,393 A | * | 7/2000 | Revelli et al. | 220/4.31 |

\* cited by examiner

*Primary Examiner*—Joseph Pelham
(74) *Attorney, Agent, or Firm*—Michael M. Sakovich

(57) ABSTRACT

A portable oven easily assembled without tools or fasteners from interfitted modular components is adapted to function in a convection mode. The components include a pair of electrical strip heaters disposed within a base frame that supports a plurality of upstanding wall panels which circumscribe a close having corners. A receiver mounted on the frame proximate each corner is recessed to releasably receive a free end of an upstanding stanchion. Each stanchion is formed with a pair of open channel members positioned orthogonally on the stanchion to face corresponding ones of channel members of opposite stanchions for slidably receiving a wall panel between the members in releasably captive relation. A removable cover is positioned in registry with the upstanding stanchions and wall panels to define a closed heating chamber. Heated air is circulated within the oven via apertures in a floor panel of the frame and a blower assembly mounted upon the cover in communication with the chamber.

9 Claims, 6 Drawing Sheets

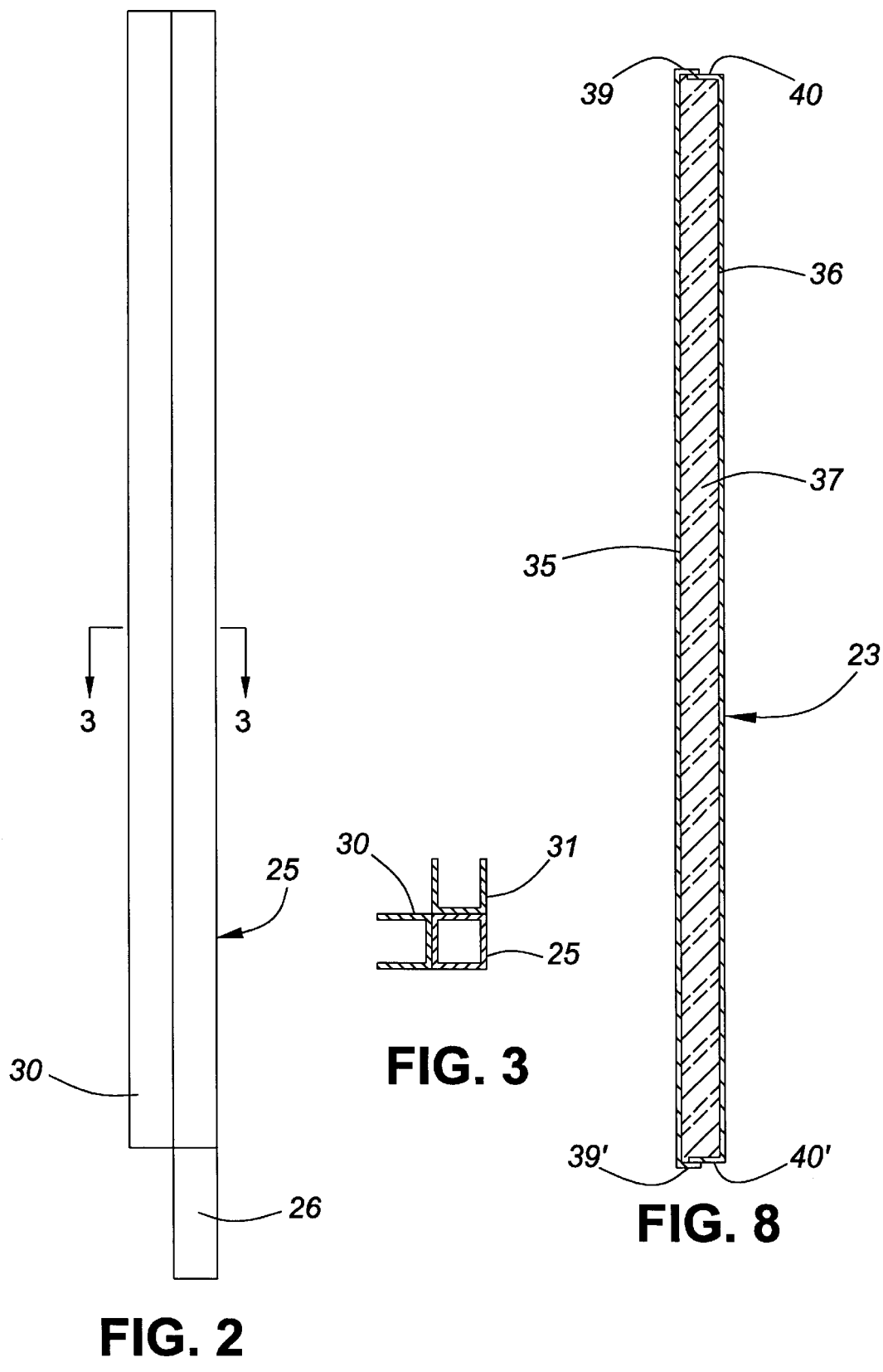

MODULAR CONVECTION OVEN

FIELD OF THE INVENTION

This invention relates to a convection oven generally and more particularly to a convection oven assembly having removable wall panels to enhance oven utility and portability.

BACKGROUND OF THE INVENTION

Convection ovens are known and find utility in applications relating to food preparation as well as in various industrial uses. A few examples of the latter include the curing of foam latex products, drying molds, rubbers and the like. Since some foam latex products and molds can be large, a conventional oven of accommodating dimensions would likely be heavy and cumbersome to handle. Problems are therefore expected to arise in handling a large oven during transportation and when accessing restricted quarters. Negotiating narrow passageways and staircases would be particularly difficult in the course of installing such an oven.

SUMMARY OF THE INVENTION

Having regard to the aforedescribed problems associated with oven mobility and portability, a principal provision of the present invention is a modular convection oven that may be conveniently disassembled to facilitate transportation and to minimize storage space requirements during periods of non-use.

Another provision of the invention is a modular convection oven having removable wall panels and support stanchions that may be readily assembled and disassembled without fasteners or hand tools.

A further provision of the invention is a modular convection oven in which removal of its wall panels facilitates access to the interior of the oven for cleaning, as well as loading and removing large items.

Still another provision of the invention is a modular convection oven having substantial capacity yet is both light in weight and conveniently portable.

The problems associated with the prior art may be substantially overcome, and the foregoing provisions achieved by recourse to the invention which relates to a modular convection oven including a heat source and a hot air circulating blower comprising, in combination, a base frame adapted to support a plurality of upstanding wall panels circumscribing a close having corners, a receiver disposed on the frame proximate each corner, an upstanding stanchion releasably supported by each receiver, a wall panel disposed in releasably captive relation between each pair of opposite stanchions, and a removable cover positioned in registry with the upstanding stanchions and wall panels to define a closed heating chamber.

BRIEF DESCRIPTION OF THE DRAWINGS

The invention will now be more particularly described with reference to an embodiment thereof shown, by way of example, in the accompanying drawings in which:

FIG. 2 is a side elevation view of a wall support stanchion shown in FIG. 1;

FIG. 3 is a cross-sectional view of the stanchion in FIG. 2 taken along the lines 3—3;

FIG. 8 is a cross-sectional view of the side wall panel in FIG. 6 taken along the lines 8—8;

DETAILED DESCRIPTION OF THE PREFERRED EMBODIMENT

Figure 1:
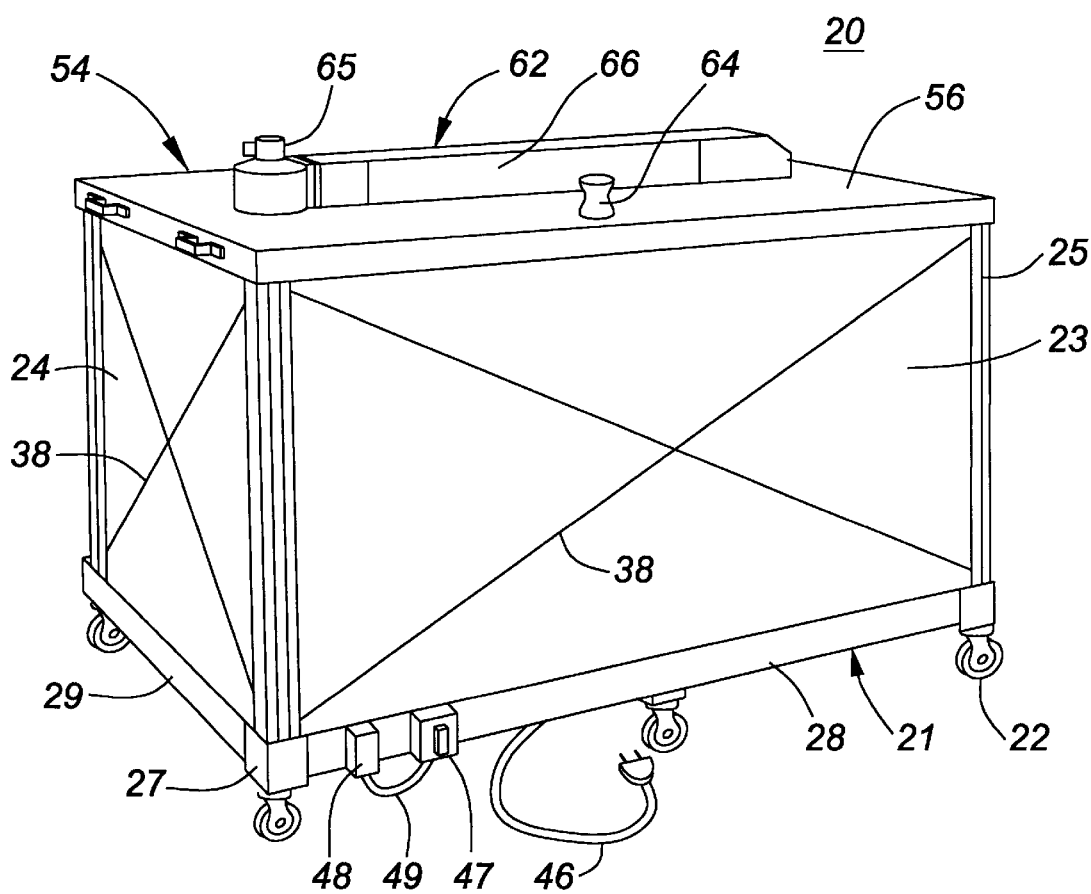
FIG. 1 is a perspective view of an assembled modular oven in accordance with the invention.

FIG. 1 is a perspective view of an assembled modular oven 20 in accordance with the present invention. Described in greater detail hereinbelow, it will be observed that the oven comprises a base frame 21 that is rollably supported by a plurality of casters 22. A caster is provided at each corner of the frame 21 with another caster positioned midway between corner casters on each, long side of the frame 21 to provide additional support. Wall modules, shown as upstanding side wall panels 23 and end wall panels 24, are mounted upon the frame 21 and circumscribe a close having corners. Corners of the close are formed by individual upstanding stanchions 25 that have a free end 26 (FIG. 2) which is slidably inserted into a corresponding receiver 27. Each receiver 27 is fabricated from a short length of square section tubing that is attached, as by welding, intermediate U-channels 28 and 29 at each corner of the frame 21. Square section tubing and U-channels described herein are preferably of steel construction for strength and economy, although aluminum may be used if weight is a concern.

Figure 4:
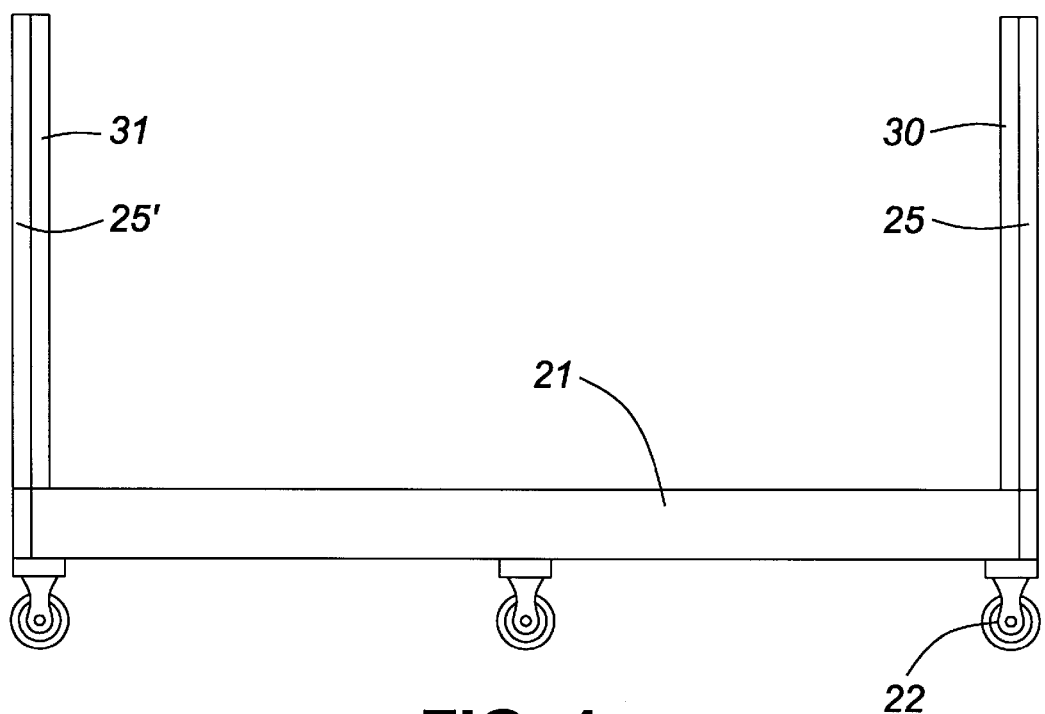
FIG. 4 is a side elevation view of a base frame in FIG. 1 displaying an upstanding wall support stanchion at each of two corners.
Figure 5:
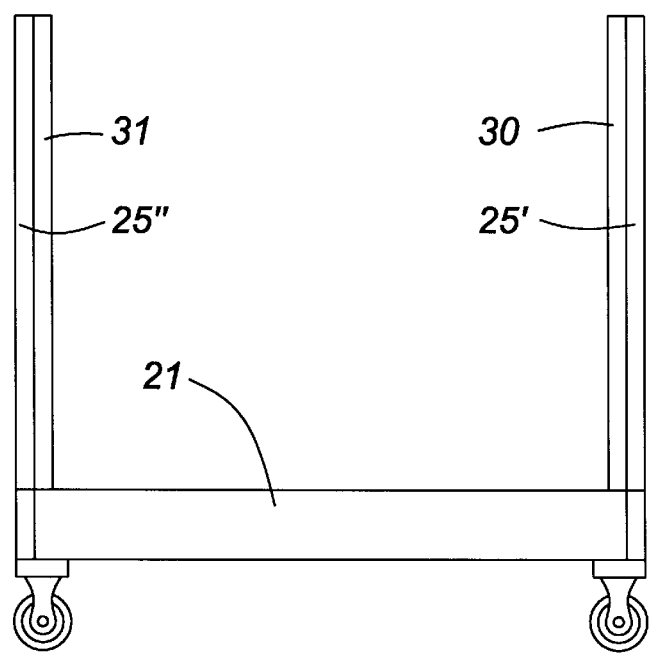
FIG. 5 is an end elevation view of the base frame displaying an upstanding wall support stanchion at each of two corners.

A side elevation view of a stanchion 25 is shown in FIG. 2 with FIG. 3 illustrating a cross-sectional view thereof taken along the lines 3—3 in FIG. 2. It will be observed that the stanchion is fabricated from square section tubing to which is attached, as by welding, a pair of orthogonally positioned open U-channel members 30, 31 which terminate adjacent the free end 26 as indicated. Positioned at respective corners of the frame 21, the stanchions 25 may be seen in FIGS. 4 and 5 with the channels 30 and 31 oriented in accordance with the stanchion 25 of FIG. 2 and the cross-sectional view thereof in FIG. 3. Thus, the long side of the frame 21 (FIG. 4) illustrates a side view of the channel 30 facing a corresponding channel 31 of a stanchion 25' at the opposite corner of the frame 21. In a similar manner, the stanchion 25' at one corner of the end view of the frame 21 (FIG. 5) illustrates a side elevation view of its channel 30 facing a corresponding channel 31 of a stanchion 25" at the opposite corner of the frame 21. This arrangement on each of four sides of the oven 20 provides releasably captive means for slidably receiving and releasing wall panels 23 and 24 that may be readily inserted or withdrawn between opposite pairs of channels 30 and 31 as required for oven assembly, transportation or storage purposes.

Although not shown in the drawings, it will be understood that the free end 26 of each stanchion 25 and its receiver 27 may be keyed together to facilitate assembly by orienting all stanchions so that opposite channels face one another.

Figure 6:
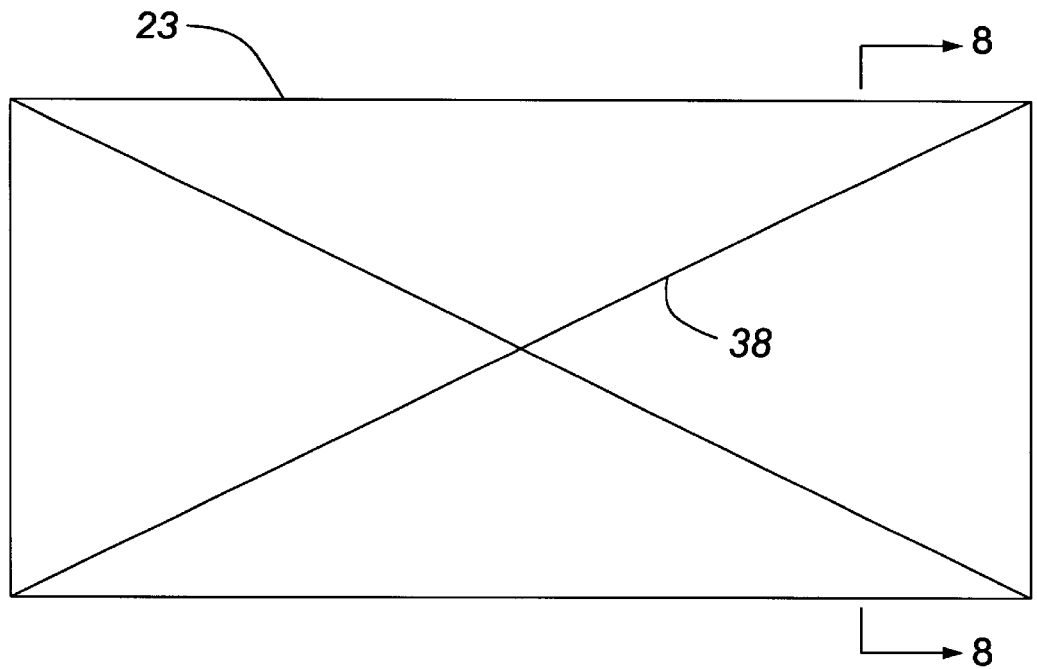
FIG. 6 is a side elevation view of a side wall panel in FIG. 1.
Figure 7:
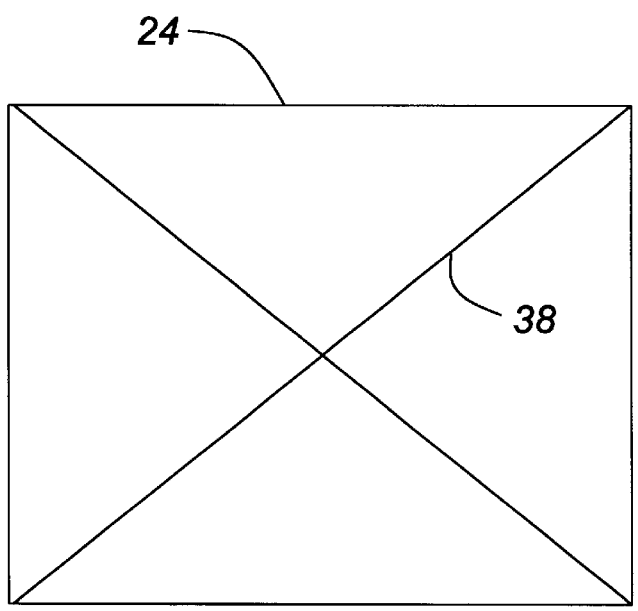
FIG. 7 is an end elevation view of an end wall panel in FIG. 1.

Elevation views of the wall panels 23 and 24 are illustrated in FIGS. 6 and 7, respectively. Except for a different dimension in length, it will be understood that the wall panel 24 is of the same construction as the wall panel 23 shown in cross-section in FIG. 8. The wall panel 23 comprises two galvanized steel sheets, shown as outer and inner walls 35, 36 respectively, which sandwich therebetween an insulation board 37 consisting of a one-inch thick layer of fiberglass having a temperature rating of 600 degrees F. A cross-break 38 (FIG. 6) is formed in the outer wall 35 to provide rigidity, thereby improving the structural integrity of the panel. Although the wall panels 23, 24 differ in length, it will be understood that this is merely a design choice and may be changed to suit individual oven size requirements.

Further construction details of the side wall panel 23 will be observed in FIG. 8 wherein the manner of attaching the wall 35 to the wall 36 is shown. Upper and lower edges 39 and 39' of the wall 35 are turned inwards and overlap corresponding upper and lower turned in edges 40 and 40' of the wall 36. Although not illustrated, it will be understood that side edges of the wall 35 and wall 36 are likewise turned inwards and overlap, thereby providing a circumferential interference fit between the overlapped edges to form an integral side wall panel 23. Assembly of an integral end wall panel 24 is done in a like manner.

Figure 9:
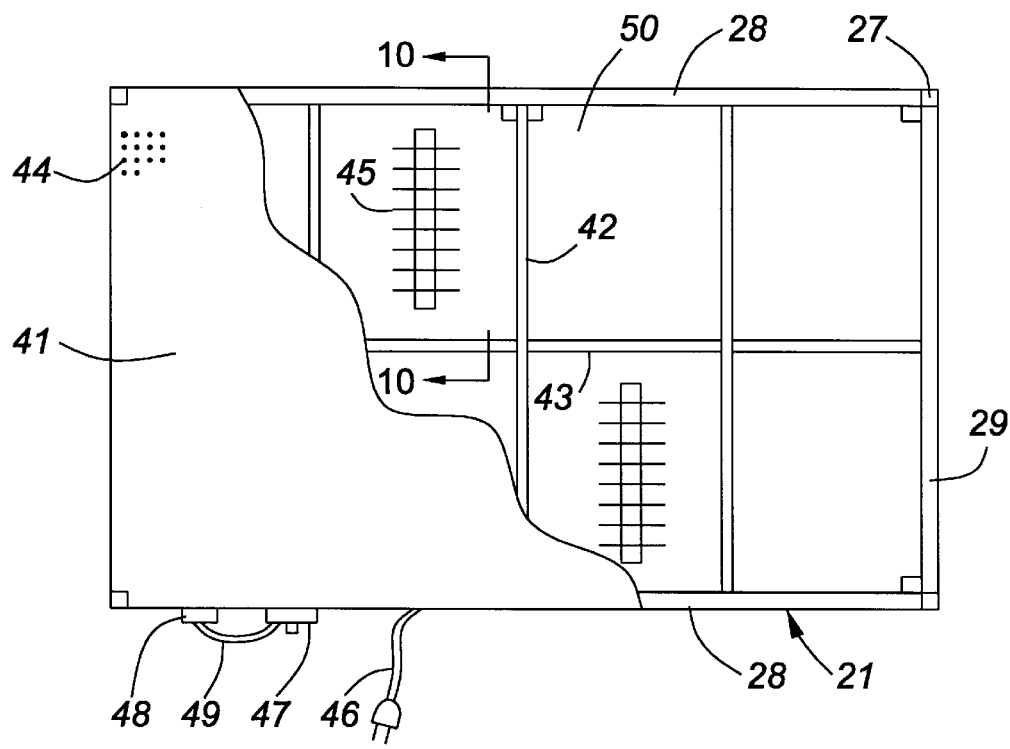
FIG. 9 is a top plan view of the base frame having a cover plate partially cut away to reveal an underlying portion of the frame.

A plan view of the frame 21 is illustrated in FIG. 9 where an oven bed, shown as a floor 41, is partially broken away to reveal a reinforced frame structure that includes transverse cross braces 42 and longitudinal cross braces 43 fabricated from square section tubing. The free ends of the braces 42 and 43 are connected to corresponding U-channels 28 and 29 as by welding. Frame rigidity is improved by intersecting the braces 42 and 43 and joining such intersections as by welding.

The floor 41 is fabricated from galvanized sheet steel stock and is apertured uniformly and substantially over its entire surface. The arrangement and number of apertures 44 is not critical although a sufficient number are required to provide adequate circulation of heated air generated by a pair of finned strip heaters 45 disposed within the frame 21 as illustrated. An example of a uniform pattern of apertures 44, each having a diameter of ½ inch, with a spacing of ¾ inch center to center is shown in a partial view in FIG. 9.

The heaters 45 are each preferably rated at 1900 watts and are powered from an alternating current 220 volt power source (not shown). Energizing current for the heaters 45 is accessed in a known manner by way of a plug-in electrical cable 46 and a double pole single throw toggle switch 47. Temperature control is achieved in a known manner by means of a thermostat 48 having a remote temperature sensing bulb (not shown) that is conveniently disposed within the oven 20. A short electrical cable 49 interconnects the switch 47 and thermostat 48.

Figure 10:
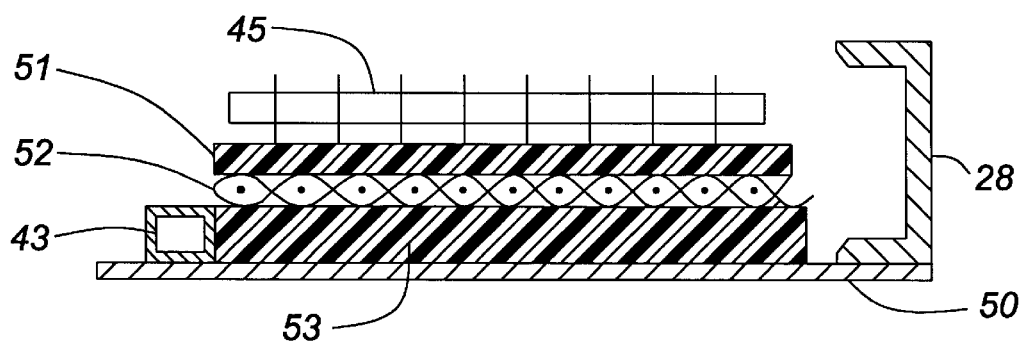
FIG. 10 is a partial cross-sectional view of the base frame in FIG. 9 taken along the lines 10—10.

A subfloor 50, also fabricated from galvanized sheet steel stock, is attached to the underside of the frame 21 to enclose the heaters 45. Thermal isolation of the heaters from the supporting surface of the oven 20 may be seen in the cross-sectional view of FIG. 10. It will be observed therein that a ceramic tile 51 is positioned under the heater 45 followed by a layer of fiberglass cloth 52 and a layer 1½ in inches in thickness of fiberglass insulation 53 between the cloth and subfloor 50.

Figure 11:
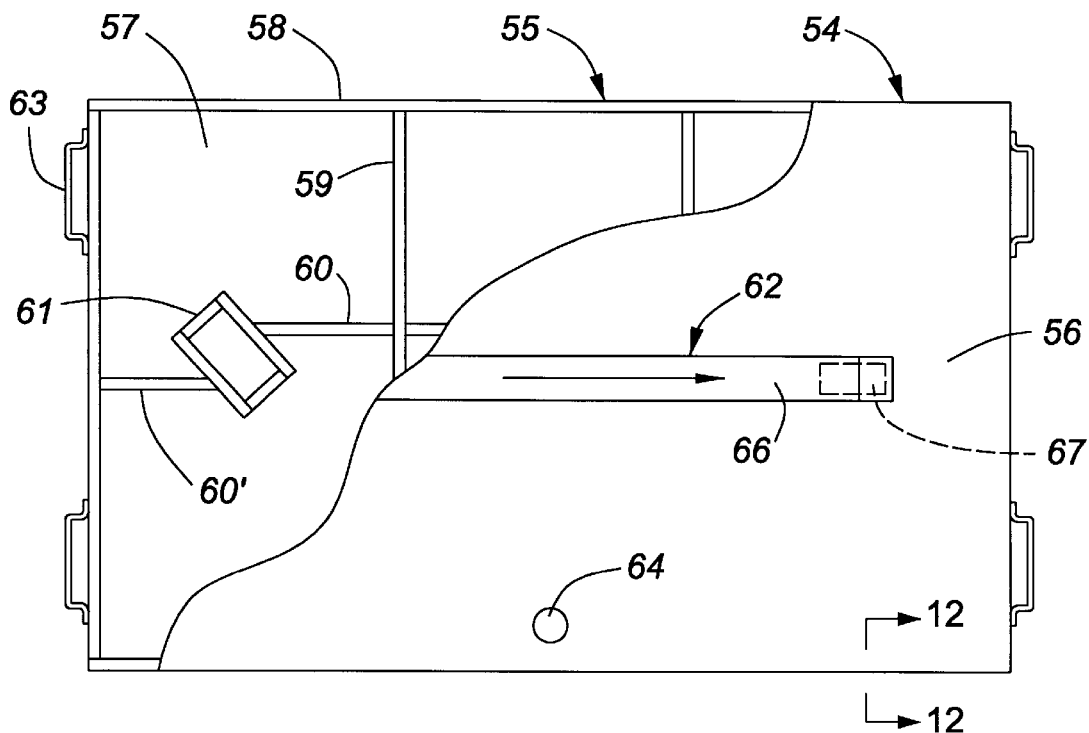
FIG. 11 is a top plan view of an oven cover in FIG. 1 that is partially cut away to reveal a portion of an underlying frame structure.

In registry with the upstanding stanchions 25 and wall panels 23 and 24, a removable cover 54 illustrated in FIGS. 1 and 11 closes a heating chamber of the oven 20. Construction of the cover 54 is similar to that of the frame 21 in that the cover comprises a top frame 55, a galvanized sheet steel outer wall 56 fixedly secured to the upper surface of the frame 55 and a like sheet steel inner wall 57 fixedly secured to the lower surface of the frame 55. The frame is constructed of square section tubing 58 that circumscribes the cover and which is reinforced by transverse cross-members 59 and longitudinal cross-members 60 and 60'. It will be observed in FIG. 11 that the frame 55 also includes a sub-frame 61 of like square section tubing to help support a circulating hot air blower assembly 62. A pair of handles 63 are provided at each end of the cover 54 for placement and removal of the cover.

Temperatures within the heating chamber of the oven are read by means of a removable thermometer 64 having a temperature sensing stem (not shown) which is insertable into the oven chamber through a small aperture (not shown) in the cover 54.

The assembly 62 comprises a fan 65 that draws heated air up through the apertures 44 and re-circulates the air within the oven 20 via a longitudinal duct 66 that is affixed to the wall 56 of the cover 54. Hot air conducted along the duct 66, as indicated by a directional arrow, is exhausted into the oven for reheating via an aperture 67 shown in broken line form in the cover 54. Although not indicated in FIG. 11, it will be understood that a corresponding aperture is formed in the cover 54 through the sub-frame 61 and under the fan 65 to draw air into the duct 66 for re-circulation.

Figure 12:
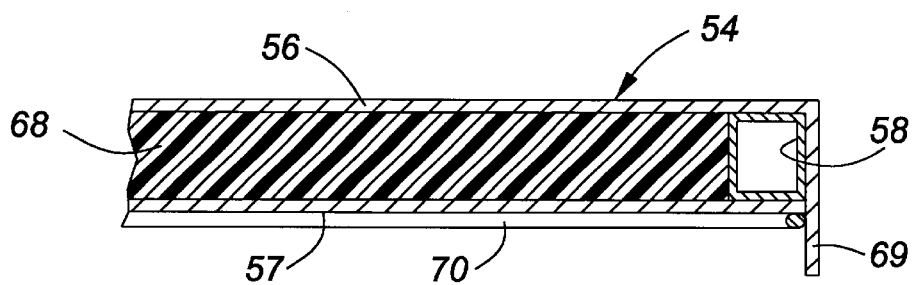
FIG. 12 is a partial cross-sectional view of the oven cover in FIG. 11 taken along the lines 12—12.

FIG. 12 illustrates a partial cross-sectional view of the cover 54 taken along the lines 12—12 of FIG. 11. It will be observed therein that the cover 54 includes an insulation board 68 which is disposed within the frame 55 and between the walls 56 and 57. A beneficial construction detail of the cover 54 structure comprises an outer edge 69 of the wall 56 which turns inwardly to overlap the tubing 58 and extends beyond the tubing as illustrated. Combined with a known heat seal 70, this configuration reduces hot air leakage when the cover closes the heating chamber.

To those skilled in the art to whom this specification is addressed, it will be apparent that the embodiment aforedescribed may be varied to meet particular specialized requirements without departing from the true spirit and scope of the invention disclosed. For example, although the invention is described in the context of a modular convection oven, the principles thereof will find equal application in a conventional oven requiring the features of light weight, portability and convenient storage. The embodiment described herein is therefore not to be taken as indicative of the limits of the invention, but rather as an exemplary structure thereof which is described by the claims appended hereto.

I claim:

1. A modular convection oven including a heat source and a hot air circulating blower comprising in combination:

a base frame adapted to support a plurality of upstanding wall panels circumscribing a close having corners, the base frame including a peripheral frame comprised of U-channels having free ends;

a plurality of transverse and longitudinal cross braces having free ends welded to corresponding peripheral U-channels for reinforcing the base frame;

a receiver comprising a tube adjoined by welding to the free ends of a pair of corresponding peripheral U-channels proximate each corner of the base. frame, and adapted to slidably receive and releasably engage a free end of a corresponding stanchion;

a plurality of upstanding stanchions, each having a free end supported by a corresponding receiver, and a pair of open channel members facing corresponding ones of channel members of an opposite stanchion for slidably receiving a wall panel of the oven between the members;

a wall panel disposed in releasably captive relation between each pair of opposite stanchions;

a floor disposed upon the upper surface of the base frame, and a subfloor fixedly secured to the lower surface of the base frame;

a removable cover positioned in registry with the upstanding stanchions and wall panels to define a closed heating chamber;

control means for selectivey energizing the heat source and hot air circulating blower, including a thermostat for regulating oven temperatures to predetermined settings; and a pair of finned strip heaters comprising the heat source disposed within the base frame and closed therein by the floor and subfloor.

2. An oven as claimed in claim 1, wherein the floor is apertured substantially over its entire surface to provide substantially free movement of air heated by the strip heaters and distributed by the circulating blower.

3. An oven as claimed in claim 2, wherein the circulating blower comprises:

a longitudinal duct mounted upon the upper surface of the removable cover, the duct communicating with the interior of the oven through a first aperture of the cover at an inlet end of the duct and a second aperture of the cover at an exhaust end of the duct; and a fan mounted integrally with the duct at its inlet end.

4. An oven as claimed in claim 3, wherein each wall panel comprises:

a first planar inner wall having peripheral first edges formed at an angle substantially orthogonal to the plane of the wall;

a first planar outer wall having peripheral second edges formed at an angle substantially orthogonal to the plane of the wall in a direction facing the first edges and overlapping the same to provide a circumferential interference fit therebetween; and an insulation board sandwiched between the inner and outer walls.

5. An oven as claimed in claim 4, wherein the cover comprises:

a top frame;

a second planar inner wall fixedly secured to the lower surface of the top frame;

a second planar outer wall fixedly secured to the upper surface of the top frame and having peripheral third edges formed at an angle substantially orthogonal to the plane of the outer wall in a direction facing the oven and extending below the junction of the cover and oven when the oven is closed;

an insulation board sandwiched between the outer and inner walls of the top frame; and a heat seal disposed alongside a junction between the second planar inner wall and the peripheral third edges to reduce hot air leakage intermediate the cover and wall panels when the oven is closed.

6. An oven as claimed in claim 5, wherein the base frame further comprises:

a ceramic tile disposed intermediate each strip heater and the subfloor;

a layer of fiberglass cloth disposed intermediate each ceramic tile and the subfloor; and a layer of fiberglass insulation intermediate the cloth and the subfloor for thermally isolating the heaters from the supporting surface of the oven.

7. An oven as claimed in claim 6, wherein the first planar outer wall includes a cross-break for structurally reinforcing the wall.

8. An oven as claimed in claim 1, wherein the free end of each stanchion is rectilinear in cross-section.

9. An oven as claimed in claim 8, wherein the free end of each stanchion is keyed to its corresponding receiver to align opposite pairs of the open channel members for slidably receiving the wall panels of the oven.

* * * * *